United States Patent
Mitsubori et al.

[11] Patent Number: 6,065,875
[45] Date of Patent: May 23, 2000

[54] TURBO CHARGER BEARING CONSTRUCTION

[75] Inventors: Ken Mitsubori, Yokahama; Yukiteru Sekita, Gyouda, both of Japan

[73] Assignee: Ishikawajima-Harima Heavy Industries Co., Ltd., Tokyo, Japan

[21] Appl. No.: 09/104,117

[22] Filed: Jun. 24, 1998

[30]   Foreign Application Priority Data

Jun. 30, 1997   [JP]   Japan .................................. 9-174485

[51] Int. Cl.⁷ .................................................. F16L 27/02
[52] U.S. Cl. .............................................. 384/99; 384/119
[58] Field of Search .............................. 384/99, 119, 100, 384/215, 312

[56]            References Cited

U.S. PATENT DOCUMENTS

| | | |
|---|---|---|
| 3,122,399 | 2/1964 | Hunter . |
| 3,485,540 | 12/1969 | Nogle ........................................ 384/119 |
| 3,589,782 | 6/1971 | Breton et al. . |
| 4,025,130 | 5/1977 | Steifert . |
| 4,229,054 | 10/1980 | Miller, Jr. . |
| 4,605,316 | 8/1986 | Utecht ........................................ 384/99 |
| 4,772,135 | 9/1988 | Griguscheit . |
| 5,017,022 | 5/1991 | Ruggles et al. . |
| 5,197,807 | 3/1993 | Kuznar ........................................ 384/99 |
| 5,603,574 | 2/1997 | Ide et al. . |
| 5,613,781 | 3/1997 | Kuzdzal et al. ........................... 384/99 |
| 5,651,616 | 7/1997 | Hustak et al. ............................. 384/99 |

FOREIGN PATENT DOCUMENTS

| | | |
|---|---|---|
| 0 359 053 | 3/1990 | European Pat. Off. . |
| 0 884 490 A2 | 12/1998 | European Pat. Off. . |
| 08261231 | 10/1996 | Japan . |

*Primary Examiner*—Thomas R. Hannon
*Attorney, Agent, or Firm*—McCormick, Paulding & Huber LLP

[57]            ABSTRACT

A bearing is provided between a turbine shaft and a bearing box in a turbine or compressor housing, a first gap of a size sufficient to form an oil film is provided between the bearing and the bearing box, and a pair of second larger gaps is provided adjacent to the first gap on both ends of the first gap in a longitudinal direction of the turbine shaft. A pair of spring members each able to exert a predetermined spring force on the bearing is provided around the entire circumference in the second gaps respectively.

13 Claims, 2 Drawing Sheets

TURBO CHARGER BEARING CONSTRUCTION

BACKGROUND OF THE INVENTION

1. Field of the Invention

The present invention relates to a turbo charger bearing construction.

2. Description of the Related Art

Floating-type bearings are generally known as turbo charger bearings. A floating bearing is arranged between a turbine shaft and a bearing support on a housing (turbine housing, compressor housing) such that a thin oil film is formed between the turbine shaft and bearing and between the bearing support and bearing, and the bearing can rotate relative to the turbine shaft and bearing support. The bearing rotates relative to the turbine shaft which rotates at high speed, at a slower speed than the turbine shaft, the effect of which is to prevent for example, not only seizure due to shortage of the oil, but also to dampen and suppress turbine shaft vibration. In some turbo chargers, an oil film damper is provided on the outer circumferential side of the bearing in order to increase the rotational stability of the shaft.

FIG. 6 of the attached diagrams depicts a conventional construction of a bearing part with this type of oil film damper. A bearing 50 is interposed between a turbine shaft 56 and a bearing support 54 on the housing 52. On the inner circumferential and outer circumferential sides of the bearing 50, thin gaps 58, 60 are respectively provided, into which a lubricating oil is introduced to form an oil film damper. Oil leakage is prevented by provision of O-rings 62 adjacent to the gaps 60 on the outer circumferential side in particular.

In this conventional construction, vibration of the turbine shaft 56 is suppressed by the oil film dampers formed in the gaps 58, 60 on the inner circumferential and outer circumferential sides of the bearing 50. In order to fill the gaps 60 of this construction with sufficient oil, however, it is necessary to dispel, at the time of assembly, air held within the gaps 60, but there are problems that the air outlets are sealed by the O-rings 62, oil filling is insufficient, and the damping effect is insufficient. Meanwhile, the O-rings 62 also contribute to suppression of vibration of the turbine shaft 56, but the effect is small because its rigidity and spring force are not very great. Moreover, the bearing 50 must be precisely centered, and the thickness of the oil film damper accurately maintained, but one cannot expect the O-ring to have much effect in this respect either because of its low rigidity.

SUMMARY OF THE INVENTION

In the turbo charger bearing construction according to one aspect of the present invention, a bearing is provided between a turbine shaft and a bearing support on the housing side, a first gap where an oil film damper can be formed is provided between the bearing and the bearing support, a pair of second larger gaps is provided adjacent to the first gap on both ends of the first gap in a longitudinal direction of the turbine shaft, and a pair of air permeable members each able to exert a predetermined spring force on the bearing is provided around the entire circumference in the second gaps respectively.

Since the air permeable members are placed in the second gaps, the air in the first gap is easily discharged to the outside through the air permeable members when assembling, i.e., the members in the second gaps do not seal the outlets of the air held in the first gap. Accordingly, the oil can smoothly be filled into the first gap and the oil film damper is reliably formed. The air permeable members may be spring members.

A predetermined spring force is applied to the bearing by the spring members, which force is greater than that applied to the bearing from the O rings of the conventional arrangement, so that the vibration of the turbine shaft is more positively suppressed. Spring members appropriate for suppression of the turbine shaft vibration can arbitrarily be adopted according to applications.

Each of the spring members may be made of metal. Each of the spring members may include a plate element extending around the entire circumference of the associated second gap, and convex parts which project inward or outward in the radial direction at equal pitch from the plate element. Each of the convex parts is elongated in the width direction of the plate element (but preferably does not extend the entire width of the plate element), and has side walls (end walls) continuous with the plate element at both ends in the direction of elongation thereof. The convex parts are in contact with the bearing outer peripheral surface when extending radially inward and in contact with the bearing support when extending radially outward, and surround the bearing in the circumferential direction of the bearing so that centering of the bearing is maintained in either case. Accordingly, the oil film damper thickness can be accurately maintained.

DETAILED DESCRIPTION OF THE INVENTION

A detailed description of a preferred embodiment of the present invention is given below based on the attached diagrams.

Figure 1:
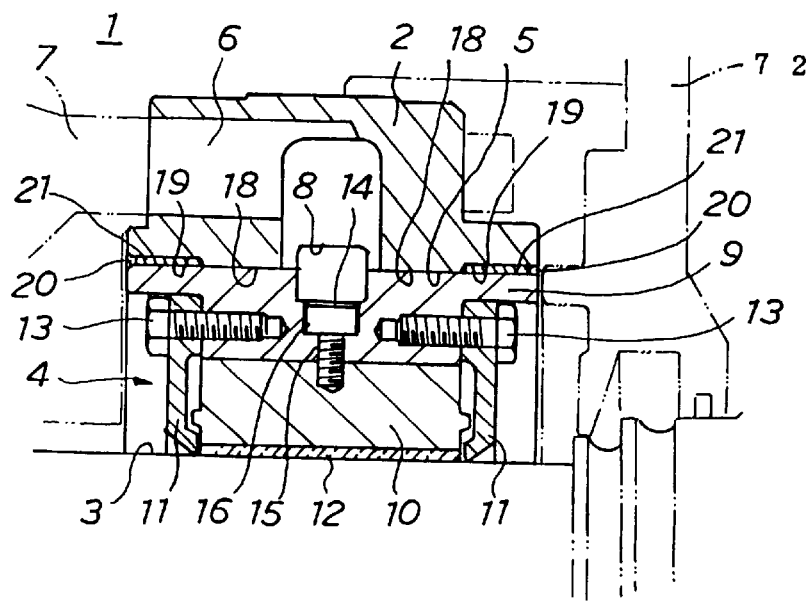
FIG. 1 is a longitudinal sectional view of a turbo charger bearing construction according to the present invention.
Figure 6:
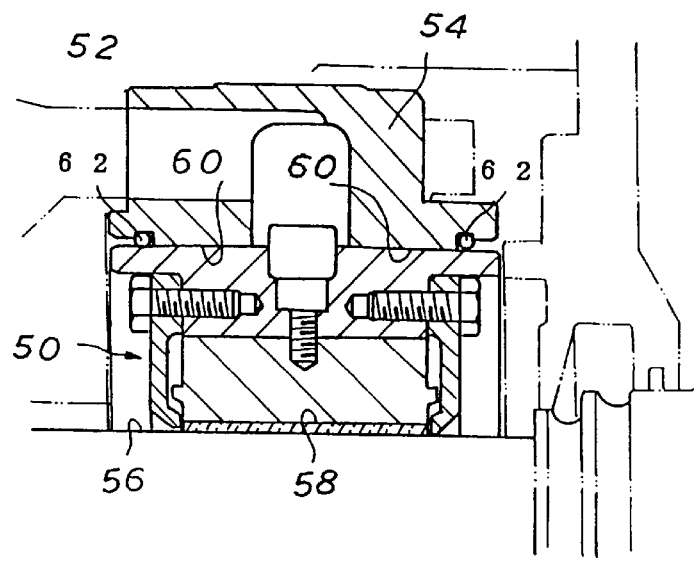
FIG. 6 is a longitudinal sectional view of a conventional turbo charger bearing construction.

As understood from FIGS. 1 and 6, a turbo charger bearing construction according to the present invention has a configuration more or less the same as in the prior art. In this embodiment, as illustrated in FIG. 1, a bearing 4 is provided between a turbine shaft 3 and a bearing support (bearing box) 2 on the housing 1 side. A turbine wheel, not depicted in the diagram, is provided on the right side of the turbine shaft 3. In other words, the configuration on the turbine side is what is depicted here.

A bearing box 2 is fitted in housing 1, is formed in a ring shape and has a central hole 5 into which a bearing 4 is fitted. An oil hole 6 is provided within the bearing box 2. The inlet of oil hole 6 runs through to an oil supply route 7 of the housing 1. The outlet of the oil hole 6 runs through to an inner circumferential groove 8 provided on an inner circumferential part of the bearing box 2. The inner circumferential groove 8 is formed across the entire circumference and opens at the surface of the central hole 5.

The bearing 4 mainly comprises a radially outward supporting member 9, a radially inward tilting pad bearing 10, and a pair of connecting plates 11 which serve to connect them. The tilting pad bearing 10 is fitted in the supporting member 9 and has an inner circumferential surface 12 that abuts against the turbine shaft 3. The abutment surface 12 is produced by casting, into the inner circumferential surface of the titling pad bearing 10, a comparatively soft tin-based metal such as white metal. The inner diameter of the abutment part 12 is slightly larger than the outer diameter of the turbine shaft 3 so that an oil film can be formed. The connecting plates 11 are fixed to both ends, in the axial direction, of the supporting member 9 using bolts 13, and the tilting pad bearing 10 is inserted and held from both ends thereof by the plates 11. An outer circumferential groove 14 which matches with the above inner circumferential groove 8 is provided in the outer circumferential surface of the supporting member 9. In addition, a radially oriented screw hole 15 is screwed through the support member 9 from the base of the outer circumferential groove 14, and a screw 16 is fitted therein such that the tilting pad bearing 10 is supported.

Figure 5:
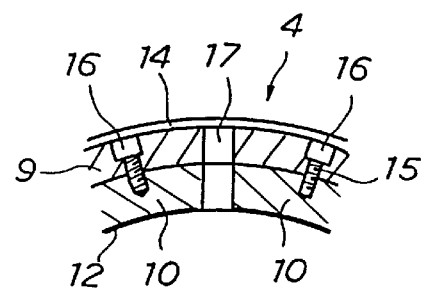
FIG. 5 is a fragmentary sectional view of the bearing cut in the circumferential direction.

FIG. 5 depicts the supporting member 9 and tilting pad bearing 10 in the connected state. As is evident in the diagram, radial oil supply holes 17 are provided in the supporting member 9 at predetermined intervals in the circumferential direction, and the tilting pad bearing 10 is divided to segments such that they coincide with the positions of the oil supply holes 17 respectively. In other words, a plurality of tilting pad bearing segments 10 are aligned at predetermined intervals in the circumferential direction, and for each tilting pad bearing 10 a separate screw 16 is provided for fixing. Accordingly, the oil supplied from the oil hole 6 (FIG. 1) of the bearing box 2 passes through the outer circumferential groove 14 and moves across the entire circumference, and passes through the oil supply holes 17 and the spaces between the tilting pad bearing segments 10, thereby being supplied to the gap between the abutment surface 12 of the bearing 4 and the turbine shaft 3.

Returning to FIG. 1, the outer diameter of the supporting member 9 is formed with a slightly smaller diameter than the diameter of the central hole 5 of the bearing box 2. As a result, a gap (first gap) 18 of a thickness allowing an oil film damper to be formed, is formed between the outer circumferential surface of supporting member 9 and the surface of the central hole 5. In other words, some of the oil supplied to the outer circumferential groove 14 of the supporting member 9 is supplied to the first gap 18, and a thin oil film damper is produced by means of this oil.

In addition, the central hole 5 has, at both its ends in the axial direction, enlarged diameter areas 19. As a result, a pair of second gaps 20, larger than the first gaps 18, is formed between the outer circumferential surface of the supporting member 9 and the surface of the enlarged diameter part 19. The second gaps 20 are provided to the side of the ends, in the axial direction, of the first gaps 18 and adjacent thereto. It should be noted that the first gaps 18 are also provided as a pair in the middle in the axial direction of the shaft, sandwiching the inner circumferential groove 8 and outer circumferential groove 14.

The space of gap 20 is larger than the space of gap 18. Thus, when the oil from the inner circumferential groove 8 and outer circumferential groove 14 flows into the gap 18, air within the gap 18 is compressed and discharged to the space of gap 20 due to the pressure of the oil, and the gap 18 can be filled with oil.

Figure 2:
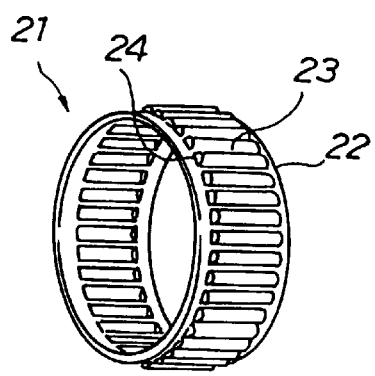
FIG. 2 is an oblique view of a spring member.

In the present embodiment in particular, a spring member 21 is provided in each of the second gaps 20. The configu-ration of a spring member 21 is shown in FIG. 2. The spring member 21 is an integrally formed component composed of metal, and is formed in a ring shape around the entire circumference of the second gap 20. In addition, it comprises a ring shaped plate element 22, and a plurality of convex parts 23 which project radially outward from the plate element 22. The convex parts 23 are formed at equal pitch in the circumferential direction and form a semicircular shape in cross section (see the unbroken line in FIG. 4). Each of the convex parts 23 is elongated in the width direction of the plate element 22, and, at both ends in the direction in which they extend, has side walls (end walls) 24 which are continuous with the plate element 22. The convex parts 23 are formed a predetermined distance inward from both ends of the plate element 22 in the width direction, in other words plate element 22 is left with edges on both sides along the entire circumference.

Figure 4:
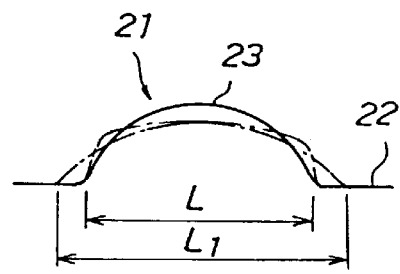
FIG. 4 is a sectional view of the spring member in its deformed state, cut in the circumferential direction.

The spring member 21 suppresses radial vibration of the turbine shaft 3 by deforming (collapsing) in the height direction of the convex parts 23. In this case in particular, the arrangement is such that deformation of the individual convex parts 23 has no effect on other pieces. In other words, as shown in FIG. 4, when the convex parts 23 are collapsed by external forces, they deform from the unbroken line to the dot-and-chain line, while the length L in the circumferential direction does not change. This is because there are the side walls 24 in the convex parts 23, and the plate elements 22 are left at both side ends. Without these, the convex parts 23 would be deformed and open to have a length L1 in circumferential direction as indicated by the broken line (L1>L), and affect the other pieces, changing the deformation properties of such pieces. A spring member 21 absorbs localized external forces only in its location, and produces an effect just like that of a number of radially oriented coil springs arrayed in the circumferential direction.

Figure 3:
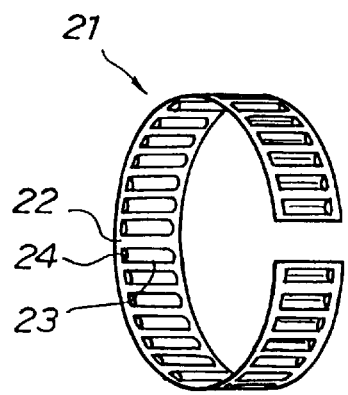
FIG. 3 is an oblique view of another spring member.

The spring member 21 may be as shown in FIG. 3. In this spring member 21, the plate element 22 is disconnected at one place in the circumferential direction, and the convex parts 23 project radially inward. Since, in this case too, the convex parts 23 can be individually deformed, there is no change in the deformation properties in the vicinity of the place of disconnection and central part of the spring member 21.

The spring members 21 with this kind of configuration are inserted in the associated second gaps 20 from the opposite axial directions respectively (from right and left directions in FIG. 1). When this is done, the bearing 4 is uniformly held from the entire circumferential side, and positioned coaxially with the central hole 5. Withdrawal of the spring members 21 is completely prevented by the housing 1 (center cover) and a turbine labyrinth ring 72. Of course, in practice, external forces from the bearing 4 and centrifugal forces during operation act on the spring members 21 and/or a collective spring force (pretension) from the convexes 23 acts, so that falling off of the spring members 21 would not occur.

Using this configuration, as well as the damping force applied to the vibration of the turbine shaft 3 by the oil film damper in the first gap 18 as with prior art, a comparatively strong spring force can be applied by the spring member 21 in the second gap 20 in particular. In this way, axial vibration is positively suppressed, and a substantial improvement in the rotational stability can be achieved. In addition, the spring members 21 have an effect of centering the bearing 4 so that the thickness of the oil film damper can be precisely maintained throughout operation, and it is also useful for large and heavy turbine shafts 3 and bearings 4. Moreover, the spring member 21 has the effect of preventing leakage of oil from the first gap 18, and of reliably maintaining the function of the oil film damper. That is, the spring member 21 fills a substantial portion, but not all of the second gap 20 and thereby to some degree obstructs movement of oil from the first gap 18 through the second gap 20 while nevertheless allowing air to move from the first gap through the second gap. In addition, it is advantageous in that it has good durability, and unlike a conventional O-ring, it does not require the provision of a ring groove on the inner surface of the center hole 5, and it is easily assembled.

Further, because the spring member 21 is configured in the manner described above, it has good deformation properties, and is suitable for suppression of vibration of the turbine shaft 3.

It should be noted that FIG. 1 illustrates a bearing construction on the turbine side, but a similar bearing construction is also provided on a compressor side (not shown). Falling off of the spring member is prevented by a bearing cover and a thrust bearing support on the compressor side.

Although a description of a preferred embodiment of the present invention has been given above, the present invention is not limited to the above described embodiment, and a variety of other embodiments may be adopted. For example, the configuration of the spring member can be altered as appropriate, and the bearing may be a common integral configuration without the tilting pad bearing.

What is claimed is:

1. A turbo charger bearing construction provided in a housing and used for a turbine shaft, comprising:
    a bearing provided between a turbine shaft and a bearing support element of a housing;
    a first gap of a size sufficient to form an oil film damper between the bearing and the bearing support element;
    a second gap provided adjacent to the first gap; and
    an air permeable spring member located in the second gap;
    said spring member comprising a plate element extending around the entire circumference of the second gap and convex parts projecting inward or outward in a radial direction of a turbine shaft at equal pitch from the plate element.

2. The turbo charger bearing construction according to claim 1, wherein each of the convex parts elongates in the width direction of the plate element, and has end walls continuous with the plate element at both ends in the direction of elongation thereof.

3. The turbo charger bearing construction according to claim 1, wherein the spring member is made of metal.

4. The turbo charger bearing construction according to claim 1, wherein the second gap is of larger diameter than the first gap.

5. The turbo charger bearing construction according to claim 1, wherein the bearing support element of the housing is a bearing box.

6. The turbo charger bearing construction according to claim 1, wherein the first gap has two longitudinal ends, and the second gap is one of two second gaps each of which second gaps is formed at a respective one of the two longitudinal ends of the first gap.

7. The turbo charger bearing construction according to claim 1 further including a third gap of a size sufficient to form a second oil film damper between the bearing and a turbine shaft.

8. The turbo charger bearing construction according to claim 1, wherein the convex parts projecting radially inward are in contact with the bearing.

9. The turbo charger bearing construction according to claim 1, wherein the convex parts projecting radially outward are in contact with the bearing support element.

10. The turbo charger bearing construction according to claim 1, wherein the air permeable member fills a substantial portion but not all of said second gap and thereby to some degree obstructs movement of oil from said first gap through said second gap while nevertheless allowing air from the first gap to move through the second gap.

11. The turbo charger bearing construction according to claim 1, wherein a cross sectional shape of each of the convex parts is semicircular.

12. The turbo charger bearing construction according to claim 1, wherein the housing is a turbine housing of a turbo charger.

13. The turbo charger bearing construction according to claim 1, wherein the housing is a compressor housing of a turbo charger.

* * * * *